US007015463B2

(12) United States Patent
Cotter et al.

(10) Patent No.: US 7,015,463 B2

(45) Date of Patent: Mar. 21, 2006

(54) MINIATURIZED SAMPLE SCANNING MASS ANALYZER

(75) Inventors: Robert J Cotter, Baltimore, MD (US); Robert D. English, Galveston, TX (US); Benjamin D. Gardner, Kalamazoo, MI (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/508,322

(22) PCT Filed: Apr. 9, 2003

(86) PCT No.: PCT/US03/10814

§ 371 (c)(1),
(2), (4) Date: Apr. 13, 2003

(87) PCT Pub. No.: WO03/086589

PCT Pub. Date: Oct. 23, 2003

(65) Prior Publication Data

US 2005/0173627 A1 Aug. 11, 2005

Related U.S. Application Data

(60) Provisional application No. 60/371,443, filed on Apr. 10, 2002.

(51) Int. Cl.
*B01D 59/44* (2006.01)
*H01J 49/40* (2006.01)

(52) U.S. Cl. ...................... 250/288; 250/281; 250/282; 250/283; 250/286; 250/287

(58) Field of Classification Search ..................... None
See application file for complete search history.

(56) References Cited

U.S. PATENT DOCUMENTS

| | | | | |
|---|---|---|---|---|
| 5,037,611 | A | 8/1991 | Ledford, Jr. | |
| 5,196,700 | A * | 3/1993 | Kameshima | 250/288 |
| 5,442,183 | A | 8/1995 | Matsui et al. | |
| 5,498,545 | A | 3/1996 | Vestal | |
| 5,583,344 | A | 12/1996 | Mizumura et al. | |
| 5,650,616 | A | 7/1997 | Iketaki | |
| 5,864,137 | A | 1/1999 | Becker et al. | |
| 5,969,350 | A | 10/1999 | Kerley et al. | |
| 6,040,575 | A | 3/2000 | Whitehouse et al. | |
| 6,204,500 | B1 | 3/2001 | Whitehouse et al. | |

(Continued)

OTHER PUBLICATIONS

Boesl, U., et al., "Reflectron time-of-flight mass spectrometry and laser excitation for the analysis of neutrals, ionized molecules and secondary fragments," International Journal of Mass Spectrometry and Ion Processes, 112 (1992) pp. 121-166.

(Continued)

*Primary Examiner*—Frank G. Font
*Assistant Examiner*—Mary El-Shammaa
(74) *Attorney, Agent, or Firm*—Pillsbury Winthrop Shaw Pittman LLP

(57) ABSTRACT

A mass spectrometer that includes an ionizing source, a sample holder arranged in a beam path of the ionizing source, an ion detector disposed to receive ions extracted from a sample when held by the sample holder and irradiated by the ionizing source. The mass spectrometer also includes an extraction electrode arranged proximate to the sample holder, and a drift tube arranged between the extraction electrode and the ion detector. In the mass spectrometer, the extraction electrode and the drift tube are movable together relative to the sample holder, which is held at a fixed position.

30 Claims, 7 Drawing Sheets

U.S. PATENT DOCUMENTS

| | | | | |
|---|---|---|---|---|
| RE37,485 | E | 12/2001 | Vestal | |
| 6,348,688 | B1 | 2/2002 | Vestal | |
| 6,414,307 | B1 * | 7/2002 | Gerlach et al. | 250/309 |
| 6,518,568 | B1 | 2/2003 | Kovtoun et al. | |
| 6,600,155 | B1 | 7/2003 | Andrien, Jr. et al. | |
| 2003/0042412 | A1 * | 3/2003 | Park | 250/281 |

OTHER PUBLICATIONS

Wiley, W.C. et al., "Time-of-Flight Mass Spectrometer with Improved Resolution," The Review of Scientific Instruments, vol. 26, No. 12, Dec. 1955, pp. 1150-1157.

Colby, Steven M., et al., "Improving the Resolution of Matrix-assisted Laser Desorption/Ionization Time-of-flight Mass Spectrometry by Exploiting the Correlation between Ion Position and Velocity," Rapid Communications in Mass Spectrometry, vol. 8, (1994), pp. 865-868.

Marable, N. L., et al., "High-Resolution Time-of-Flight Mass Spectrometry Theory of the Impulse-focused Time-of-flight Mass Spectrometer," International Journal of Mass Spectrometry and Ion Physics, 13 (1974) pp. 185-194.

Browder, J.A., et al., "High-Resolution TOF Mass Spectrometry. II. Experimental Confirmation of Impulse-Field Focusing Theory," International Journal of Mass Spectrometry and Ion Physics, 37 (1981) pp. 99-108.

Yefchak, George E., et al., "Models for Mass-Independent Space and Energy Focusing in Time-of-Flight Mass Spectrometry," International Journal of Mass Spectrometry and Ion Processes, 87 (1989) pp. 313-330.

Kinsel, Gary R., et al., "Post Source Pulse Focusing: A Simple Method to Achieve Improved Resolution in a Time-of-Flight Mass Spectrometer," International Journal of Mass Spectrometry and Ion Processes, 91 (1989) pp. 157-176.

Kinsel, Gary R., et al., "High-Resolution Mass Spectrometry of Large Molecules in a Linear Time-of-Flight Mass Spectrometer," Journal of American Society for Mass Spectrometry, vol. 4, No. 1, Jan. 1993, pp. 2-10.

Kovtoun, Slava V., et al., "Mass Correlated Acceleration In a Reflectron MALDI TOF Mass Spectrometer: An Approach for Enhanced Resolution Over a Broad Mass Range," Journal of the American Society for Mass Spectrometry, vol. 13, No. 2, Feb. 2002, pp. 135-143.

Mamyrin, B.A., et al., "The mass-reflectron, a new nonmagnetic time-of-flight mass spectrometer with high resolution," Sov. Phys.-JETP, vol. 37, No. 1, Jul. 1973, pp. 45-48.

Cotter, Robert J., "The New Time-of-Flight Mass Spectrometry," Analytical Chemistry News & Features, Jul. 1, 1999, pp. 445A-451A.

Krutchinsky, Andrew N., et al., "Automatic Identification of Proteins with a MALDI-Quadrupole Ion Trap Mass Spectrometer," Analytical Chemistry, vol. 73, No. 21, Nov. 1, 2001, pp. 5066-5077.

Bryden, Wayne A., et al., "The Tiny-TOF Mass Spectrometer for Chemical and Biological Sensing," Johns Hopkins APL Technical Digest, vol. 16, No. 3, (1995), pp. 296-310.

* cited by examiner

MINIATURIZED SAMPLE SCANNING MASS ANALYZER

RELATED APPLICATIONS

This Application is the U.S. National Phase Filing of PCT/US03/10814, filed Apr. 9, 2003, which is based on U.S. Provisional Application 60/371,443, filed Apr. 10, 2002, the entire contents of both of which Applications are hereby incorporated by reference.

STATEMENT AS TO RIGHTS TO INVENTIONS MADE UNDER FEDERALLY SPONSORED RESEARCH AND DEVELOPMENT

The present invention was conceived during the course of work supported by grant No. R01 RR08912 from the National Institutes of Health, grant No. DABT163-99-1-0006 and grant No. BAA00-09-013 from DARPA.

BACKGROUND OF INVENTION

1. Field of Invention

The present invention relates to a mass spectrometer in general and in particular to a miniaturized sample scanning mass spectrometer.

2. Description of Related Art

Mass spectrometers are instruments that are used to determine the chemical composition of substances and the structures of molecules. In general they consist of an ion source where neutral molecules are ionized, a mass analyzer where ions are separated according to their mass/charge ratio, and a detector. Mass analyzers come in a variety of types, including magnetic field (B) instruments, combined electrical and magnetic field or double-focusing instruments (EB or BE), quadrupole electric field (Q) instruments, and time-of-flight (TOF) instruments. In addition, two or more analyzers may be combined in a single instrument to produce tandem (MS/MS) mass spectrometers. These include triple analyzers (EBE), four sector mass spectrometers (EBEB or BEEB), triple quadrupoles (QqQ) and hybrids (such as the EBqQ).

In tandem mass spectrometers, the first mass analyzer is generally used to select a precursor ion from among the ions normally observed in a mass spectrum. Fragmentation is then induced in a region located between the mass analyzers, and the second mass analyzer is used to provide a mass spectrum of the product ions. Tandem mass spectrometers may be utilized for ion structure studies by establishing the relationship between a series of molecular and fragment precursor ions and their products.

Alternatively, they are now commonly used to determine the structures of biological molecules in complex mixtures that are not completely fractionated by chromatographic methods. These may include mixtures of (for example) peptides, glycopeptides or glycolipids. In the case of peptides, fragmentation produces information on the amino acid sequence.

One type of mass spectrometers is time-of-flight (TOF) mass spectrometers. The simplest version of a time-of-flight mass spectrometer, illustrated in FIG. 1 (Cotter, Robert J., Time-of-Flight Mass Spectrometry: Instrumentation and Applications in Biological Research, American Chemical Society, Washington, D.C., 1997), the entire contents of which is hereby incorporated by reference, consists of a short source region 10, a longer field-free drift region 12 and a detector 14. Ions are formed and accelerated to their final kinetic energies in the short source region 10 by an electric field defined by voltages on a backing plate 16 and drawout grid 18. The longer field-free drift region 12 is bounded by drawout grid 18 and an exit grid 20.

In the most common configuration, the drawout grid 18 and exit grid 20 (and therefore the entire drift length) are at ground potential, the voltage on the backing plate 16 is V, and the ions are accelerated in the source region to an energy: $mv^2/2=z\,eV$, where m is the mass of the ion, v is its velocity, z the number of charges, and e is the charge on an electron. The ions then pass through the drift region 12 and their (approximate) flight time(s) is given by the formula:

$$t=[(m/z)/2\ eV]^{1/2}D \tag{I}$$

which shows a square root dependence upon mass. Typically, the length s of source region 10 is of the order of 0.5 cm, while drift lengths (D) ranges from 15 cm to 8 meters. Accelerating voltages (V) can range from a few hundred volts to 30 kV, and flight time are of the order of 5 to 100 microseconds. Generally, the accelerating voltage is selected to be relatively high in order to minimize the effects on mass resolution arising from initial kinetic energies and to enable the detection of large ions. For example, the accelerating voltage of 20 KV (as illustrated, for example, in FIG. 1) has been found to be sufficient for detection of masses in excess of 300 kDaltons.

In recent years, the development of an ionization technique for mass spectrometers known as matrix-assisted laser desorption ionization (MALDI) has generated considerable interest in the use of time-of-flight mass spectrometers and in improvement of their performance. MALDI is particularly effective in ionizing large molecules (e.g. peptides and proteins, carbohydrates, glycolipids, glycoproteins, and oligonucleotides) as well as other polymers. The TOF mass spectrometer provides an advantage for MALDI analysis by simultaneously recording ions over a broad mass range, which is the so called multichannel advantage. In MALDI method of ionization, biomolecules to be analyzed are recrystallized in a solid matrix (e.g., sinnipinic acid, 3-hydroxy picolinic acid, etc.) of a low mass chromophore that its is strongly absorbing in the wavelength region of the pulsed laser used to initiate ionization. Following absorption of the laser radiation by the matrix, ionization of the analyte molecules occurs as a result of desorption and subsequent charge exchange processes. In TOF instruments, all ion optical elements and the detector are enclosed within a vacuum chamber to ensure that ions, once formed, reach the detector without collisions with the background gas.

A number of techniques have been developed to improve the mass resolution of time-of-flight mass spectrometers. Mass resolution is reduced by the initial distributions in the velocity and position of the ions when they are formed. The simplest of the techniques used to improve resolution is the incorporation of a two stage extraction system to provide space focusing at the detector for an instrument with a long drift length, and a second order space-focusing for an optimal drift length (Cotter, R. J., Time-of-Flight Mass Spectrometry: Instrumentation and Applications in Biological Research, American Chemical Society, Washington, D.C. 1997, Boesl, U., Weinkauf, R., Schlag, E. W., Int. J. Mass Spectrom. Ion Processes 112 (1992) 121–166). Pulsed extraction and time-delayed extraction techniques have been used to address both space and energy (velocity) focusing (Wiley, W. C., McLaren, I. H., Rev. Sci. Instrumen. 26 (1955) 1150–1157), including the correlated space/velocity distributions proposed for MALDI (Colby, S. M., King, T. B., Reilley, J. P., Rapid Commun. Mass Spectrom. 8 (1994) 865).

Other improvements introduced into time-of-flight spectrometers include miniaturization. An example of a miniaturized TOF mass analyzer is shown in FIG. 2 (Cotter, R. J., The New Time-of-Flight Mass Spectrometery, Anal. Chem 71 (1999) 445A–451A). In mass analyzer instrument 22, samples are presented as a 10×10 array of sample spots (not shown), mounted on a movable XY stage 24. The length of the ion source, i.e. the distance between the surface of movable stage 24 and grid 26, is about 1 inch (2.54 cm) and the length of the drift region 28 is 3 inches (7.6 cm). In mass spectrometer 22 the sample stage 24 and grid 30 are initially at a potential of 6.45 kV. The grid 26 is connected to the drift tube liner and is held at a potential between −1.9 and 12.2 kV of the first channel plate of a gridless Hamamatsu dual channel plate detector 32 (a dual channel plate detector is used to increase the gain of the signal detected). This arrangement eliminates any post acceleration of the ions into the detector. Moreover, this arrangement enables the amplified current pulse from the detector to be taken near ground potential. The drift tube liner is a half inch thin-walled tubing that insures an equipotential (field free) region across the drift length. The sample surface can be, for example, pulsed from 6.45 kV to 9.75 kV, i.e. using a 3.3 kV pulse (as illustrated in FIG. 2). The delay time for pulsing is adjusted to provide best focusing to the front channel plate for a given mass, i.e. maximum mass resolution.

Examples of mass spectra from this instrument are shown in FIGS. 3A and 3B. The mass spectrum in FIG. 3A records peptide biomarkers from Bacillus globigii spores. Although this 3-inch mass analyzer is considerably smaller than the one meter or larger mass analyzers common in commercial instruments, the mass range is limited only by the kinetic energy of the ions at the time they reach the detector. In this case, depending on the drift region bias voltage, the kinetic energy is from 11.6 keV to 11.95 keV. This is sufficient to record ions as large as 66 kdalton molecular ion of bovine serum albumin as shown in the mass spectrum of FIG. 3B.

Most commercial MALDI time-of-flight spectrometers now provide analysis of multiple samples loaded at the same time on a sample holder into the vacuum system. The multiple samples on the sample holder include, for example, "slides" which are one dimensional arrangements from 8 to 30 sample spots, large format two-dimensional arrays using 96 or 384 samples similar to those used in microtiter plates (Vestal M. L., Mass Spectrometer System and Method for Matrix-Assisted Laser Desorption Measurements, U.S. Pat. No. RE37485E, Dec. 25, 2001, U.S. Pat. No. 5,498,545, Mar. 12, 1996), and higher density microarrays or "samples on a chip."

An example of a two dimensional array sample holder is shown in FIG. 4. Two dimensional array sample holder 40 holds a plurality of samples 42. The plurality of samples are in this case a two dimensional array of samples. The samples on the sample holder are loaded into a vacuum system for mass analysis. Once samples are loaded into the vacuum system of the mass spectrometer, the conventional way to select a sample for analysis is by moving the sample array. Two dimensional arrays of samples on the sample holder 40 are conventionaly mounted on an XY translational stage 44, controlled either manually or by a computer-data system, to bring each sample into the focal point of a laser beam (the ionizer) and the ion extraction optics (not shown in this Figure) which are for example aligned relative to axis AA' perpendicular to the plane of the sample holder. In addition to sample selection, movement of the sample stage also enables the selection of an area on each sample where the ion signal is more intense. Sample holder 40 is positioned on XY translational stage 44 comprising positioning stage represented by arrow 44X in the X direction and positioning stage 44Y represented by arrow Y in the Y direction.

In this common arrangement, the laser beam and optics, and the ion extraction optics, flight lengths and detectors and other portions of the mass analyzer are stationary within the instruments. It is also common that the sample surface or stage be biased at some high electrical potential. The high potential is used to define the ion kinetic energy. The flight tube (not shown) is, hence, biased near ground potential. The signal from the ion detector is taken either at or close to ground through a 50 ohm output.

In this arrangement, the volume required to accommodate a two dimensional sample array is considerable, and defines both the overall instrument dimensions as well as the capacity of the mechanical and turbomolecular pumping system. Indeed, the sample plate must be moved across an area 46, defining the footprint of the movement of the XY stage, equal to more than 4 times the area of the sample plate or sample holder 40 in order to accommodate and analyze each of the samples 42 across the entire sample array 40. Furthermore, since the sample stage is biased at some high voltage, an additional space 48 (in the X direction) and 49 (in the Y direction) is reserved between the walls of the vacuum chamber and the maximum extension of the XY stage such that the stage would not come in contact with the wall of the vacuum chamber held at a ground potential.

For example, for a 127×86 mm sample array format, the total area needed for the movement of the sample plate alone would be at least 25.4×17.2 cm. In addition, the XY stage and its associated drive mechanisms, some or all of which may be at high voltage, contribute to the depth of a large volume within the mass spectrometer needed to accommodate the entire sample handling system.

SUMMARY OF THE INVENTION

An aspect of the present invention is to provide a mass spectrometer which includes an ionizing source, a sample holder arranged in a beam path of the ionizing source, and an ion detector disposed to receive ions extracted from a sample when held by the sample holder and irradiated by the ionizing source. The mass spectrometer also includes an extraction electrode arranged proximate the sample holder, and a drift tube arranged between the extraction electrode and the ion detector. In the mass spectrometer, the extraction electrode and the drift tube are movable together relative to the sample holder which is held at a fixed position.

In one embodiment, the mass spectrometer further includes an acceleration electrode disposed between the extraction electrode and the drift tube. The sample holder can be configured to hold a plurality of samples. For example, the plurality of samples can be arranged in a single row and the sample holder is a tape-like structure. The plurality of samples can also be arranged in a two-dimensional array on the sample holder or arranged in a plurality of two dimensional arrays on the sample holder. The sample holder can also be a disk having an opening suitable for mounting on a rotating assembly. In one embodiment, the plurality of samples are arranged concentrically around the opening and the extraction electrode and the drift tube can be moved in a radial direction of the disk relative to the opening.

The mass spectrometer may further include a vacuum chamber and the ion detector, the extraction electrode and the drift tube are disposed inside the vacuum chamber. The sample holder can be, for example, a continuous tape which is sealingly introduced into the vacuum chamber through an opening in a wall of the vacuum chamber or a continuous tape in a tape-cassette and the tape cassette is disposed in the vacuum chamber.

In one embodiment, the mass spectrometer further includes a sample holder voltage source and the sample holder is connected to the sample holder voltage source to establish a sample holder voltage potential relative to the ground potential.

In another embodiment, the mass spectrometer further includes an extraction voltage source and the extraction electrode is connected to the extraction voltage source to establish an extraction voltage potential relative to the voltage potential of the sample holder. The sample holder voltage potential can be pulsed. Similarly, the extraction electrode voltage potential can also be pulsed.

In one embodiment, the mass spectrometer further includes a drift tube voltage source and the drift tube is connected to the drift tube voltage source to establish a drift tube voltage potential.

In another embodiment, the mass spectrometer further includes an acceleration electrode voltage source and the acceleration electrode is connected to the acceleration voltage source to establish a voltage potential substantially equal to a voltage potential of the drift tube.

The ion detector in the mass spectrometer can be anyone of an electron multiplier, a channeltron, or a micro-channel plate assembly or the like. In one embodiment, the ion detector is movable together with the extraction electrode and the drift tube relative to the sample holder. In another embodiment, the ion detector is fixed in a substantially stationary position relative to the sample holder. In this case, the micro-channel plate assembly has a detection area substantially subtending an area of the sample holder.

The ionizing source in the mass spectrometer can be, for example, a laser system. In one embodiment, the mass spectrometer further includes a tracking assembly so that the laser can track a movement of the extraction electrode and the drift tube. In this way a laser beam emitted by the laser is directed upon the sample which is directly under the extraction electrode. In another embodiment, the mass spectrometer further includes an optical fiber. The optical fiber can track the movement of the extraction electrode and the drift tube and is used to direct a laser beam emitted by the laser upon the sample which is directly under said extraction electrode.

Another aspect of the present invention is to provide a method of analyzing a plurality of samples disposed on a sample holder by a mass spectrometer comprising an ionizing source, an ion detector, an extraction electrode arranged proximate to the sample holder, and a drift tube arranged between the extraction electrode and the ion detector. The method includes positioning the extraction electrode and the drift tube above a first sample in the plurality of samples, ionizing the first sample with the ionizing source to form a plurality of first ions, detecting first ions from the plurality of first ions with the ion detector and identifying at least a portion of said first ions detected. The method further includes moving at least the extraction electrode and the drift tube together relative to the sample holder to a second sample of the plurality of samples, ionizing the second sample with the ionizing source to form a plurality of second ions, detecting second ions from the plurality of second ions with the ion detector, and identifying at least a portion of the second ions detected.

BRIEF DESCRIPTION OF THE DRAWINGS

These and other objects and features of the invention will become more apparent and more readily appreciated from the following detailed description of the presently preferred exemplary embodiments of the invention, taken in conjunction with the accompanying drawings, of which:

FIG. 3A is an example of a mass spectrum of serum albumin obtained by the miniaturized mass spectrometer of FIG. 2;

DETAILED DESCRIPTION OF SEVERAL EXEMPLARY EMBODIMENTS OF THE INVENTION

One aspect of the present invention is to provide a mass spectrometer in which the ion optics, ionizing source and optionally a detector are movable relative to the sample holder held in a fixed position rather than translating the sample holder or sample stage relative to the mass spectrometer which is held in a fixed position.

Figure 1:
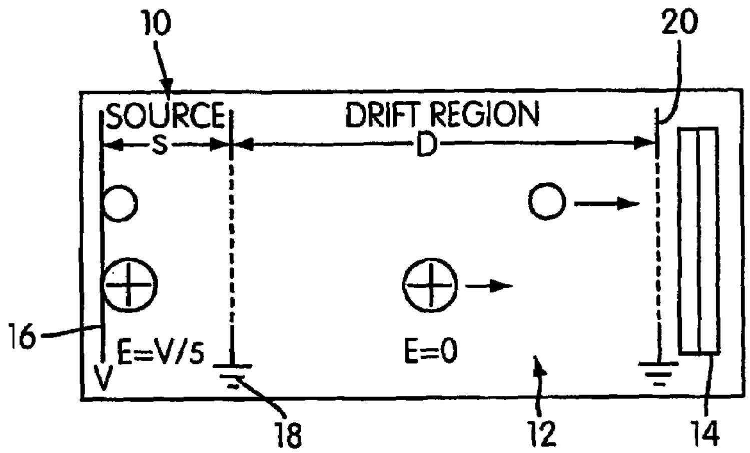
FIG. 1 is a schematic representation of a conventional time-of-flight spectrometer.
Figure 2:
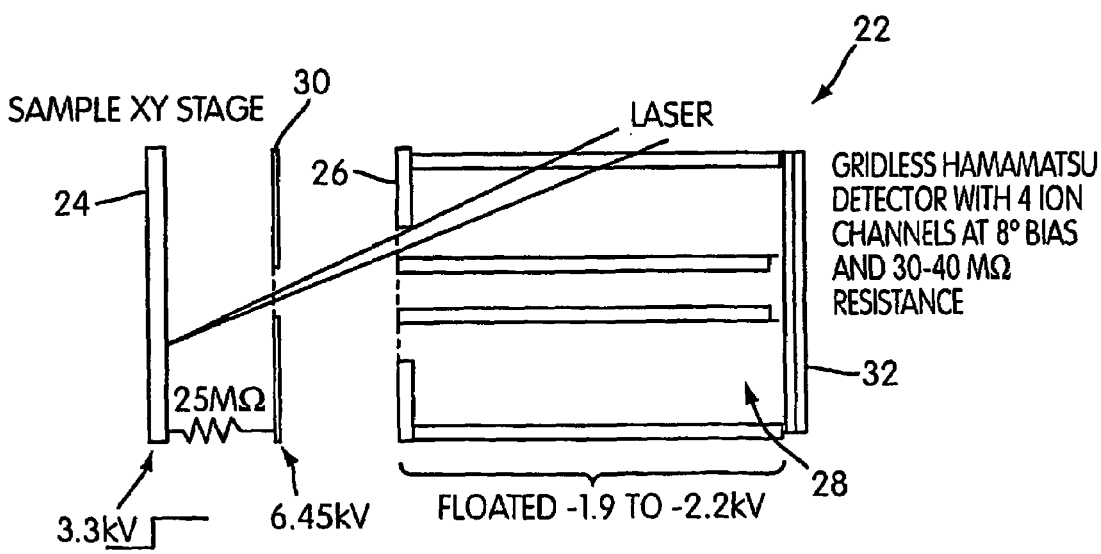
FIG. 2 is schematic representation of a conventional miniaturized time-of-flight spectrometer.
Figure 3A:
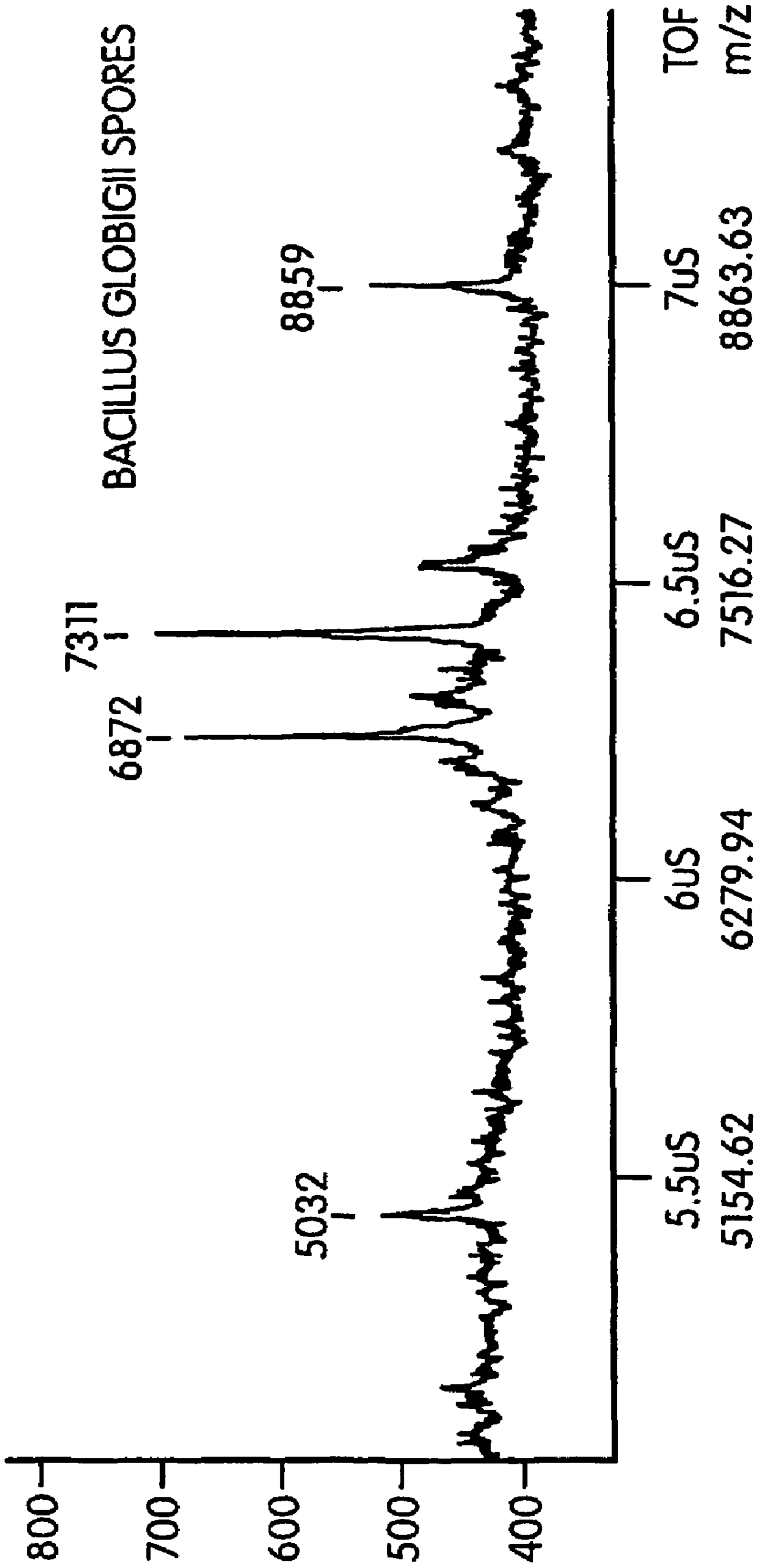
FIG. 3A is an example of a mass spectrum of B. globigii spores obtained by the miniaturized mass spectrometer of FIG. 2.
Figure 3B:
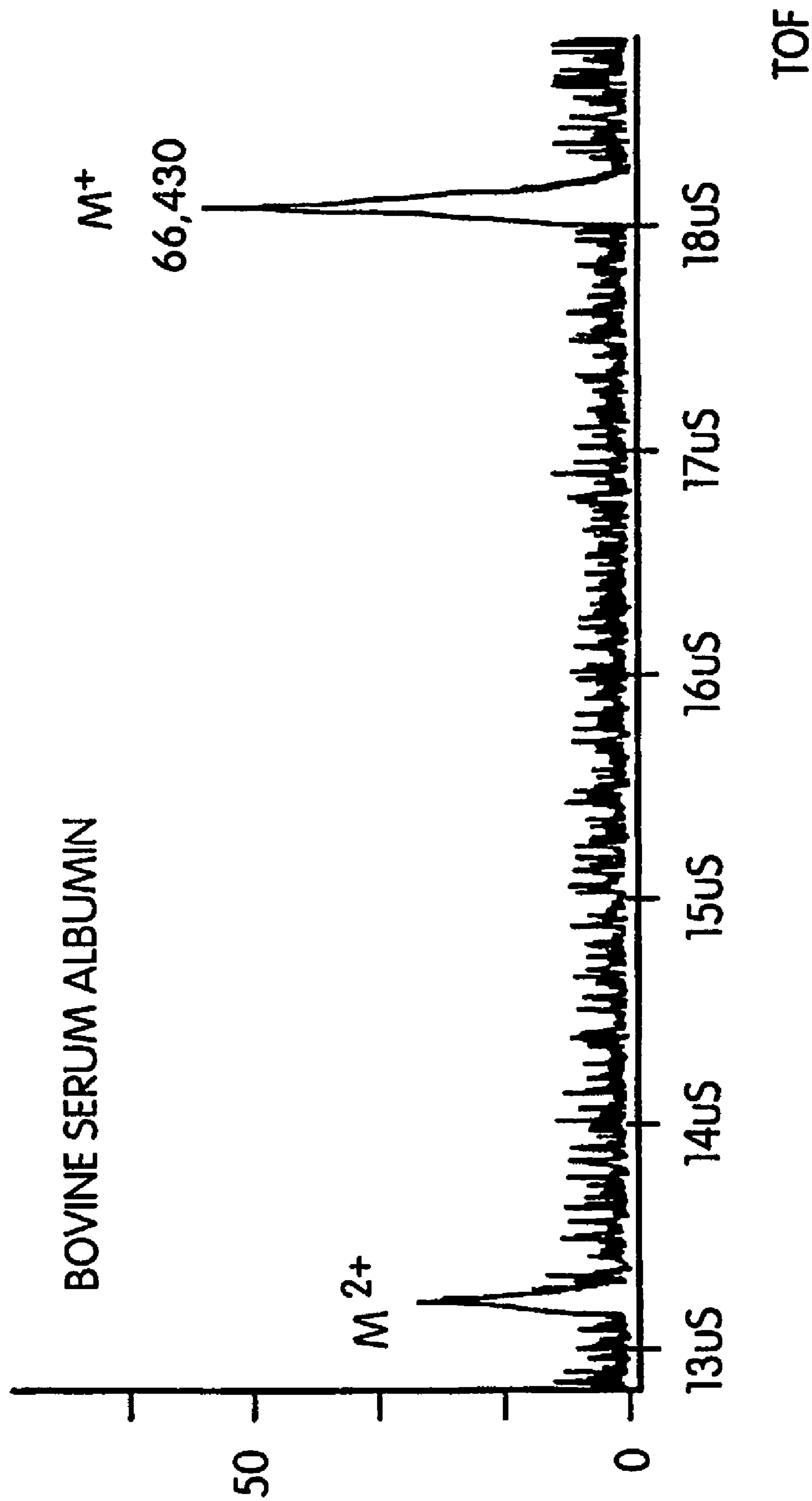
Figure 4:
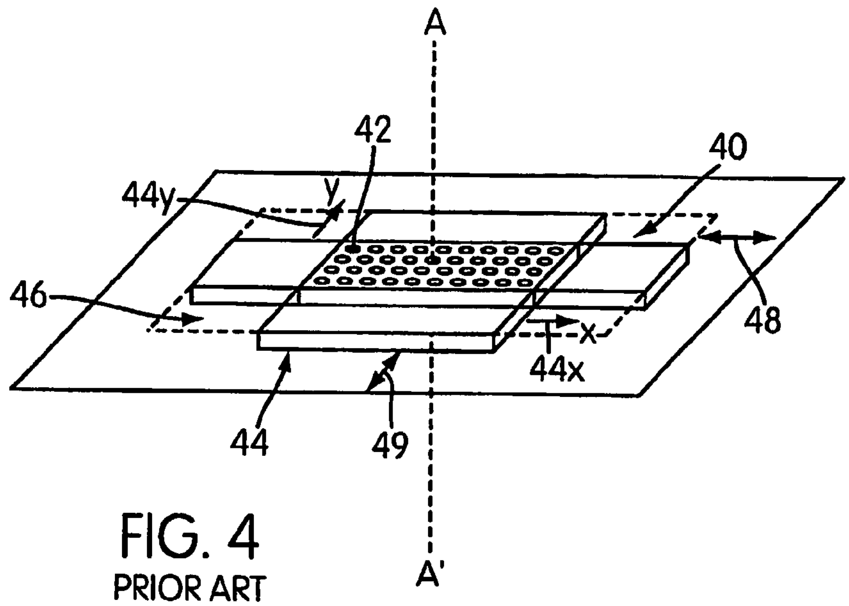
FIG. 4 is a conventional two dimensional array sample holder.
Figure 5:
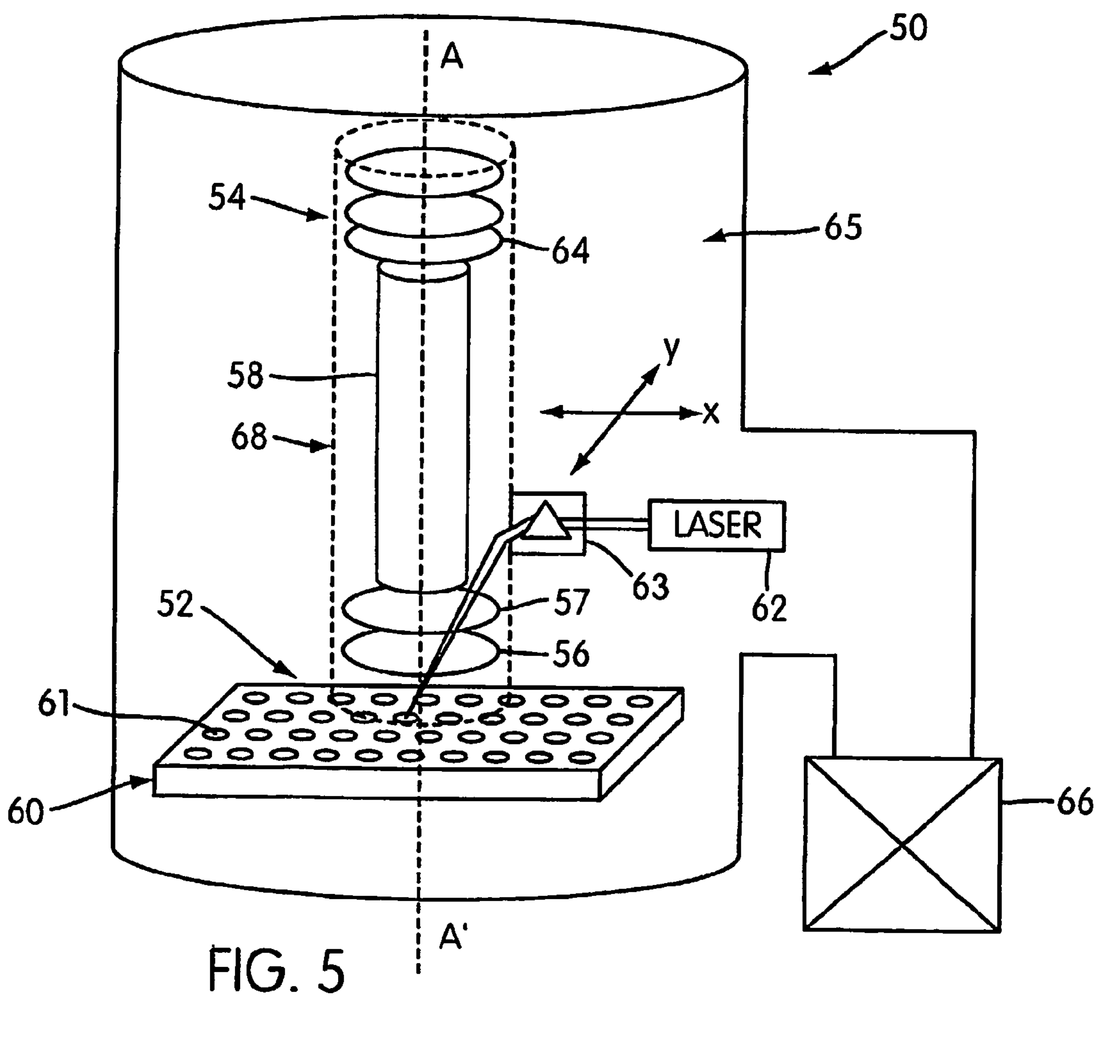
FIG. 5 is a schematic representation of one embodiment of a mass spectrometer according to the present invention using a two-dimensional array sample holder.

One embodiment of a mass spectrometer according to the present invention is shown in FIG. 5. Mass spectrometer 50 is a time-of-flight spectrometer comprising ion source 52, ion detector 54, extraction electrode 56 arranged proximate ion source 52, and a drift tube 58 arranged between extraction electrode 56 and detector 54. The mass spectrometer can further include an acceleration electrode 57.

The ion source 52 comprises a sample plate 60 and an ionizing source 62. The sample plate 60 can hold a sample of material 61 which can be a single sample or a plurality of samples arranged in a one or two dimensional array configuration. The sample material 61 can be, for example, a biomolecular material such as DNA, protein or the like. The sample plate 60 is biased at relatively high voltage potential, for example, 20 kV (the voltage is measured relative to the ground potential). The sample plate can, for example, have a dimension of 5×3.4 inches (approximately 12.7×8.64 cm).

The ionizing source 62 can be, for example, a radiation source such as laser radiation, well suited for Matrix Assisted Laser Desorption Ionization (MALDI. Suitable lasers include lasers that emit in the ultraviolet as these lasers ionize the sample efficiently.

The extraction electrode 56 comprises a grid electrode held at a voltage potential relative to the sample plate 60 such that ions formed in the sample 61 are extracted and directed toward the entrance of drift tube 58. The acceleration electrode is held at a same potential as drift tube 58 which is in most situations connected to the ground or biased at some relatively low voltage potential such as 0 to 100V.

The extraction electrode 56 is held at, for example, a potential of 15 kV to 18 kV. If the potential at the sample plate 60 is 20 kV, the difference of potential between the extraction electrode 56 and the sample plate 60 is 2 kV to 5 kV allowing the ions to acquire an initial kinetic energy of 2 keV to 5 keV (for singly charged ions).

The voltage of the sample plate 60 or the voltage of the extraction electrode 56 can be pulsed. Pulsing the sample plate voltage or the extraction voltage allows achieving better focusing of the ions. Various pulsing schemes exist, this includes several variations of voltage waveforms (e.g., linear, exponential) as well as adjusting the delay time of the voltage pulse relative to the laser pulse (in MALDI). Exemplary ion pulsing extraction methods have been described in a commonly assigned U.S. Pat. No. 6,518,568, the entire contents of which are incorporated herein by reference.

During operation, the mass spectrometer 50 is enclosed inside vacuum chamber 65 to allow collisionless movement of ions formed in ion source 52. The vacuum chamber 65 is pumped with pump 66 and pressure is kept bellow $5\times10^{-7}$ Torr. Although the chamber 65 is illustrated in FIG. 5 as having a cylindrical shape, other geometrical shapes are also within the scope of the present invention.

The drift tube 58 is also cylindrical in shape, however other shapes are also within the scope of the present invention. The drift tube is made of an electrically conductive metal such as stainless-steal or the like. The drift tube 58 is maintained at nearly ground potential to allow free movement of the ions traveling therethrough. The drift tube 58 may also be biased to a relatively low voltage potential (0 to 100 V) to allow additional focusing of the ion beam. The longitudinal dimension of the drift tube can be for example 3 inches (approximately 7.6 cm) and the diameter of the tube can be, for example, 0.5 inch (approximately 1.27 cm).

The detector 54 can be selected from any commercially available charged particles detector. Such detectors include, but are not limited to, an electron multiplier, a channeltron or a micro-channel plate (MCP) assembly. Although, a micro-channel plate is shown used as the detector in FIG. 5, one skilled in the art would readily understand that using other detectors are also within the scope of the present invention.

An electron multiplier is a discrete dynode with a series of curved plates facing each other but shifted from each such that an ion string one plate creates secondary electrons and an effect of electron avalanche follows through the series of plates. A channeltron is a horn-like continuous dynode structure that is coated on the inside with an electron emissive material. An ion striking the channeltron creates secondary electrons that have an avalanche effect to create more secondary electrons and finally a current pulse.

A microchannel plate is made of a leaded-glass disc that contains thousands or millions of tiny pores etched into it. The inner surface of each pore is coated to facilitate releasing multiple secondary electrons when struck by an energetic electron or ion. When an energetic particle such as an ion strikes the material near the entrance to a pore and releases an electron, the electron accelerates deeper into the pore striking the wall thereby releasing many secondary electrons and thus creating an avalanche of electrons.

In most applications, two channel plates are assembled to provide an increased gain of electrons. In the embodiment shown in FIG. 5, a MCP assembly is used as the ion detector 54. An exit electrode grid 64 is provided in front of the MCP assembly. Electrode grid 64 is maintained at substantially the same potential as the drift tube 58.

The detected electron signal corresponding to an ion striking the detector is further amplified, integrated, digitized and recorded into a memory for later analysis and/or displayed through a graphical interface for evaluation.

The mass spectrometer 50 consists of detecting the arrival of the ions at the detector 54 and measuring their time-of-flight in reference to firing the laser pulse or the application of a voltage pulse to the sample plate 60 or extraction electrode 56. The voltage pulse applied to the sample plate 60 or extraction electrode 56 may be delayed relative to the laser pulse to increase efficiency of ion extraction. Since, as explained above, the time-of-flight is proportional to the square root of the mass of the ions, knowing the time-of-flight allows the determination of the mass of the ions and thus the identification of the ions.

In this embodiment, the sample holder or sample plate 60 is fixed relative to the walls of the vacuum chamber 65 and the extraction electrode 56, acceleration grid 57, drift tube 58, and detector 54 move as one assembly 68 (mass analyzer assembly) relative to the sample plate 60 in order to scan across the array of samples 61. The mass analyzer assembly 68 moves both in the X direction as well as the Y direction to allow scanning of selected samples in an area of sample plate or sample holder 60. During scanning of the sample plate 60, the mass analyzer assembly 68 is arranged such that the symmetry axis AA' of assembly 68 is always maintained substantially perpendicular to each of the samples 61.

During scanning of the sample plate 60, the ionizing source (e.g. laser) 62 tracks the movement of the assembly 68 in order to ionize each selected sample. The movement of the laser beam emitted from the laser can be accomplished, for example, by using articulated assembly 63 comprised of articulated optics that brings the laser beam to a focusing lens (not shown) mounted on the mass analyzer assembly 68. Alternatively, the laser beam can be directed to the sample by using a suitable optical fiber wherein at least a portion of the optical fiber is coupled to the mass analyzer assembly 68.

Figure 6:
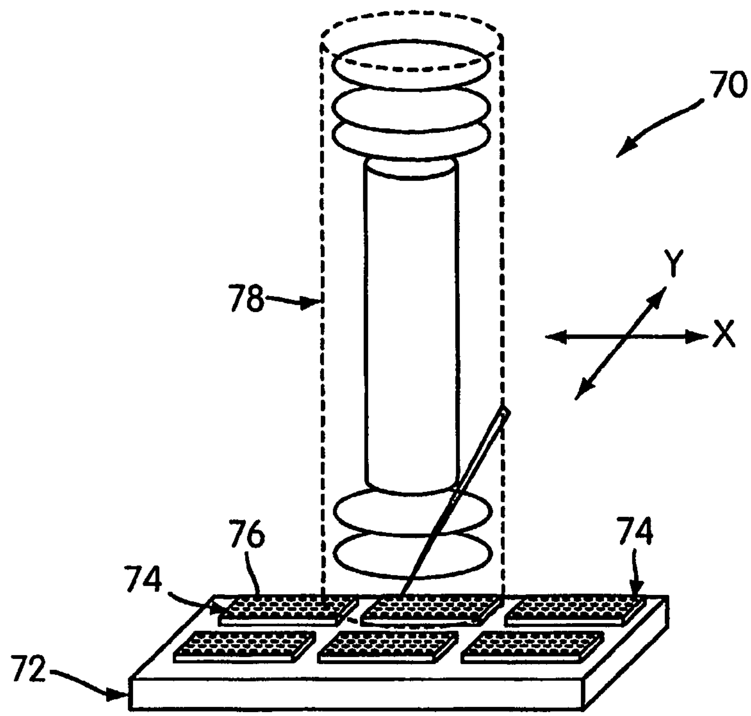
FIG. 6 is a schematic representation of another embodiment of a mass spectrometer according to the present invention using multiple two-dimensional arrays sample holder.

Another embodiment of a mass spectrometer according to the present invention is shown in FIG. 6. Mass spectrometer 70 is similar the mass spectrometer 50 except that in mass spectrometer 70, the sample holder 72 is used to hold a plurality of sample micro-arrays 74. In turn, each sample micro-array contains a plurality of samples 76. This configuration is used in the case where very high sample density is needed.

Similarly to mass spectrometer 50, mass spectrometer 70 comprises mass analyzer assembly 78. Mass analyzer assembly 78 is movable relative to the sample holder 72. The mass analyzer is capable of scanning all of the samples 76 in the sample holder 72 by moving the mass analyzer assembly in the X and Y direction over each of the sample micro-arrays 74 and then fine tuning the movement of the mass analyzer assembly 78 in the X and Y directions to scan each of the samples 76.

Figure 7:
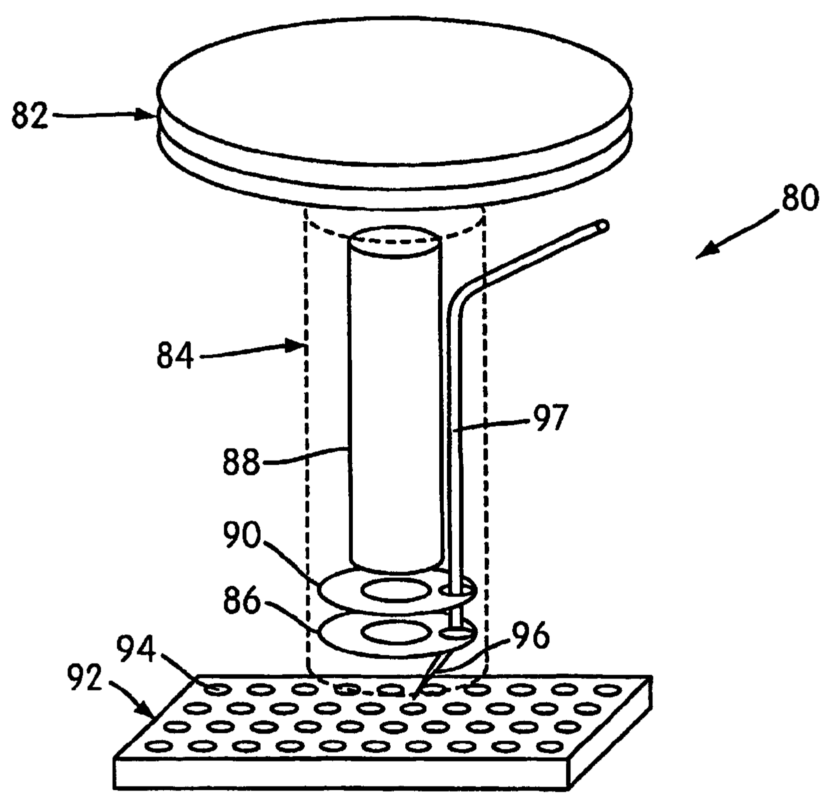
FIG. 7 is a schematic representation of another embodiment of a mass spectrometer according to the present invention.

Another embodiment of a mass spectrometer according to the present invention is shown in FIG. 7. Mass spectrometer 80 is similar to mass spectrometers 50 and 70 except that in mass spectrometer 80, the detector 82 is not part of mass analyzer assembly 84. Mass analyzer assembly 84 comprises extraction electrode 86, drift tube 88 and optionally acceleration electrode (grid electrode) 90. Detector 82 comprises a micro-channel plates assembly similar to the MCP assembly described in the previous embodiments.

Similarly to the previous embodiments, mass analyzer assembly 84 is movable relative to sample holder 92. The mass analyzer assembly 84 is capable of scanning selected samples 94 in sample holder 92 by moving the mass analyzer assembly 84 in the X and Y direction over the selected samples 94.

During scanning of the sample holder 92, the ionizing source (laser beam) 96 tracks the movement of the assembly 84 in order to ionize each selected sample 94. In this embodiment, the laser beam 96 is directed to the selected sample via optical fiber 97 which is coupled to the mass analyzer assembly 84 to follow the movement of the mass analyzer assembly 84.

In mass spectrometer 80, however contrary to mass spectrometers 50 and 70, the detector 82, which comprises a MCP assembly, does not move with mass analyzer assembly 84. Therefore, in order to detect ions formed by ionization of the material in each of the samples 94, the MCP assembly in detector 82 is selected to have a substantially larger size than the size of sample holder 92. In other words, the MCP assembly in detector 82 has an area size which substantially "covers" the whole area of sample holder 92.

Figure 8:
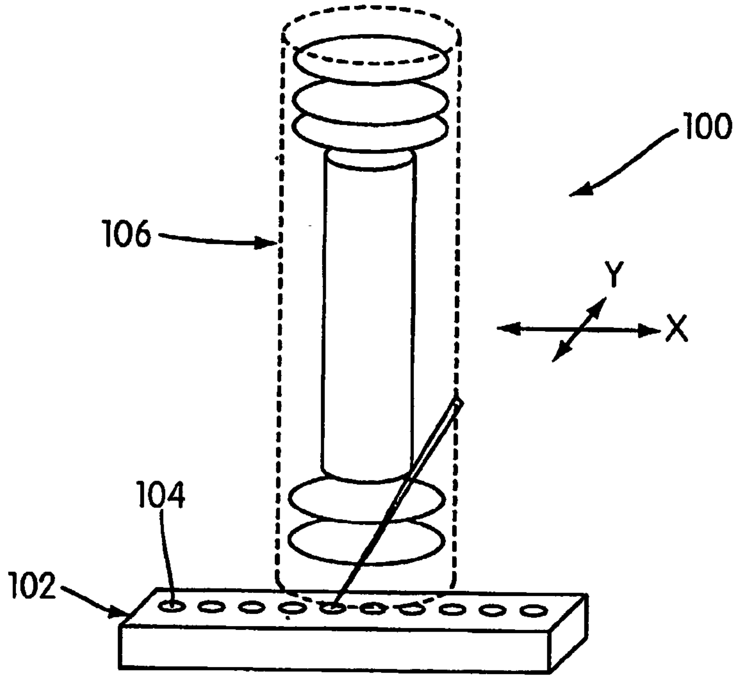
FIG. 8 is a schematic representation of one embodiment of a mass spectrometer according to the present invention using a single array sample holder.

Another embodiment of a mass spectrometer according to the present invention is shown in FIG. 8. Mass spectrometer 100 is similar to mass spectrometers 50 and 70 except that in mass spectrometer 100, the sample holder 102 is a "slide" having a one dimensional array of samples 104.

Similarly to mass spectrometer 50, mass spectrometer 100 comprises mass analyzer assembly 106. Mass analyzer assembly 106 is movable relative to the sample holder 102. The mass analyzer assembly 106 is capable of scanning all of the samples 104 in the sample holder 102 by moving the mass analyzer assembly 106 in the X direction over each of the samples 104. Fine translation along the X and Y directions is used to position the mass analyzer assembly 106 above a selected area of the sample spot. Fine movement in X and Y directions within a sample allows analyzing a specific spot in the selected sample.

Figure 9:
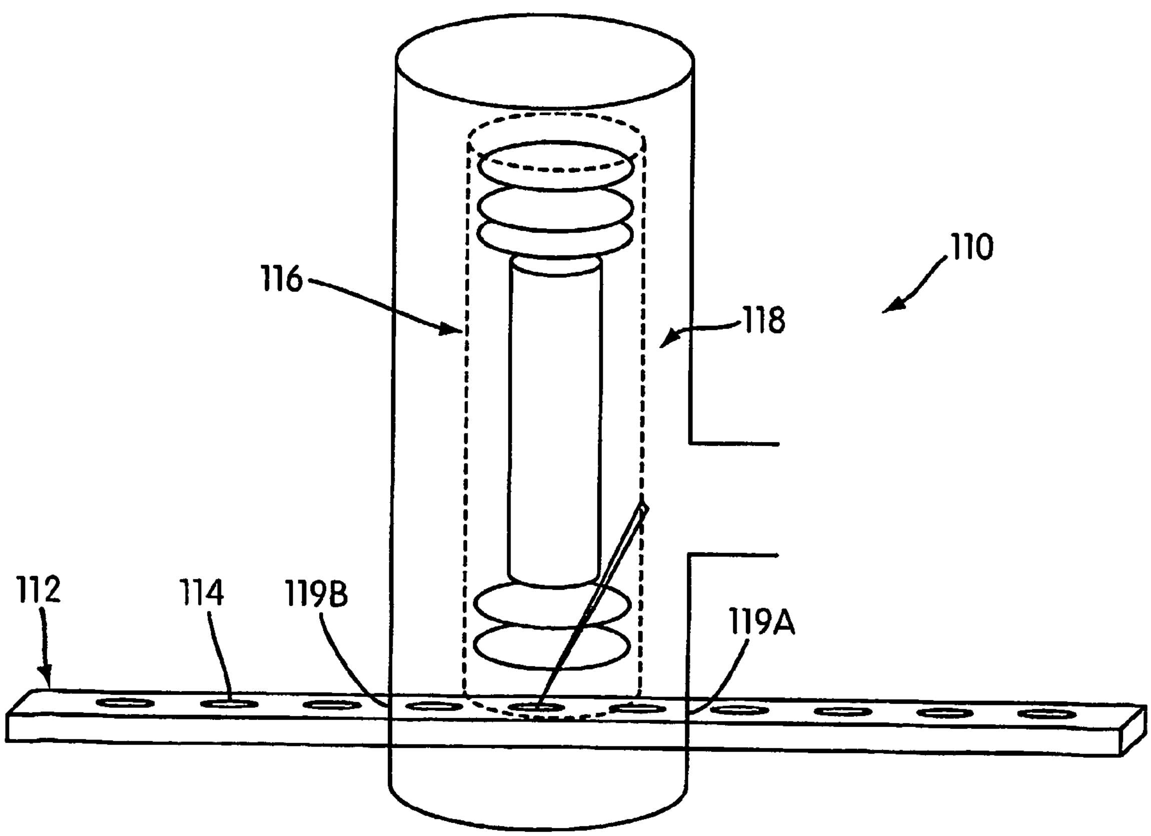
FIG. 9 is a schematic representation of an embodiment of a mass spectrometer according to the present invention using a tape configuration sample holder.

Another embodiment of a mass spectrometer according to the present invention is shown in FIG. 9. Mass spectrometer 110 is similar to mass spectrometers 100 except that in mass spectrometer 110, the sample holder 112 is a continuous tape having a one dimensional array of samples 114. In this configuration, the continuous tape 112 is introduced into vacuum chamber 118 through opening or slit 119A in a wall of the vacuum chamber 118 and exits through opening or slit 119B in vacuum chamber 118. Openings 119A and 119B are provided with seals to seal a portion of the tape 112 under study in vacuum chamber 118. Although the motion of the tape might accomplish sample selection, translating the mass analyzer assembly 116 would provide the additional ability to analyze specific locations or spots within each sample.

In another configuration, the tape 112 may be rolled in a cassette (not shown), for example, and the whole cassette may be introduced into the vacuum chamber 118. Alternatively, the cassette having the tape 112 may be disposed outside the vacuum chamber 118 and the tape 112 is introduced through opening 119A rolled back to cassette through exit opening 119B. A further option, is to pump the vacuum chamber each time the mass spectrometer 110 comes sealingly in contact with the surface of the tape 112 to perform mass analysis of a sample and break the vacuum to allow the mass spectrometer to move to a next sample. By repeating this process one can scan a selected block of samples.

Figure 10:
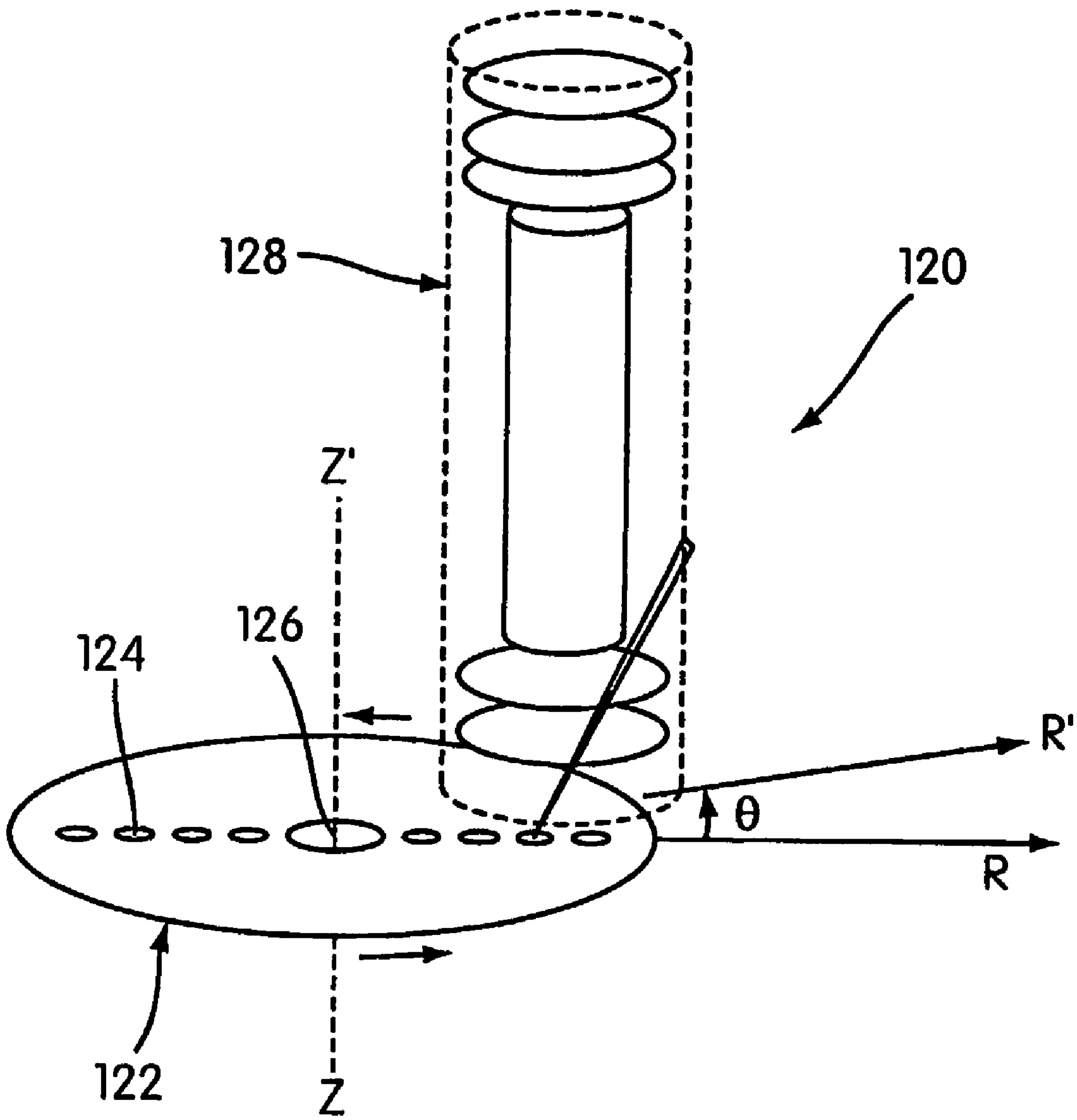
FIG. 10 is a schematic representation of an embodiment of a mass spectrometer according to the present invention using a disk configuration sample holder.

Another embodiment of a mass spectrometer according to the present invention is shown in FIG. 10. Mass spectrometer 120 is similar to mass spectrometers 50, 70, 100 except that in mass spectrometer 120, the sample holder 122 is a disk, such as that of a CD ROM. In this configuration, the disk 122 holds a plurality of samples 124 arranged concentrically around opening 126. The disk 122 is fixed via opening 126 to a stand and/or a rotor to allow rotation of the disk around an axis ZZ' passing through the center of opening 126 and perpendicular to the plane of the disk 122.

Similarly to mass spectrometers 50, 70 and 100, mass spectrometer 120 comprises mass analyzer assembly 128. Mass analyzer assembly 128 is movable relative to the disk 122. The mass analyzer is capable of scanning all of the samples 124 in the disk 122 by moving the mass analyzer assembly 128 in a radial direction R to scan all samples in that radial direction R and rotating the disk azimuthally at angle $\theta$ to the next radial direction R' and scan the samples in that radial direction R'. By repeating this process one can scan all the samples 124 in disk 122 or scan selected samples 124 by skipping radial positions R and/or angular positions $\theta$. In this configuration, the mass analyzer assembly 128 does not move azimuthally. In an alternative embodiment, the disk 122 can remain in a fixed position and in order to scan all the samples in the disk, the mass analyzer assembly is moved both radially (R) and azimuthally ($\theta$).

By allowing the mass analyzer to move instead of the sample holder, the relative size of a mass spectrometer according to the present invention is substantially reduced. Consequently, the volume pumped by the vacuum pumping system is reduced. This, in turn, allows further increased miniaturization of the mass spectrometer.

Although the mass spectrometer of the present invention is shown in various specific embodiments, one of ordinary skill in the art would appreciate that variations to these embodiments can be made therein without departing from the spirit and scope of the present invention. For example, although the mass spectrometer has been described with the use of a laser as an ionizing source, one of ordinary skill in the art would appreciate that using electrospray, atmospheric pressure ionization (API) and atmospheric MALDI (APMALDI) is also within the scope of the present invention. The many features and advantages of the present invention are apparent from the detailed specification and thus, it is intended by the appended claims to cover all such features and advantages of the described apparatus which follow the true spirit and scope of the invention.

Furthermore, since numerous modifications and changes will readily occur to those of skill in the art, it is not desired to limit the invention to the exact construction and operation described herein. Moreover, the process and apparatus of the present invention, like related apparatus and processes used in mass spectrometry arts tend to be complex in nature and are often best practiced by empirically determining the appropriate values of the operating parameters or by conducting computer simulations to arrive at a best design for a given application. Accordingly, all suitable modifications and equivalents should be considered as falling within the spirit and scope of the invention.

We claim:

1. A mass spectrometer, comprising:
an ionizing source;
a sample holder arranged in a beam path of said ionizing source;
an ion detector disposed to receive ions extracted from a sample when held by said sample holder and irradiated by said ionizing source;
an extraction electrode arranged proximate said sample holder; and
a drift tube arranged between said extraction electrode and said ion detector,
wherein said extraction electrode and said drift tube are movable together relative to said sample holder; said sample holder being held at a fixed position.

2. A mass spectrometer as recited in claim 1, further comprising an acceleration electrode disposed between said extraction electrode and said drift tube.

3. A mass spectrometer as recited in claim 1,
wherein said sample holder is configured to hold a plurality of samples.

4. A mass spectrometer as recited in claim 3,
wherein said plurality of samples are arranged in a single row and said sample holder is a tape-like structure.

5. A mass spectrometer as recited in claim 3,
wherein said plurality of samples are arranged in a two-dimensional array on said sample holder.

6. A mass spectrometer as recited in claim 3,
wherein said plurality of samples are arranged in a plurality of two dimensional arrays on said sample holder.

7. A mass spectrometer as recited in claim 3,
wherein said sample holder is a disk having an opening suitable for mounting on a rotating assembly.

8. A mass spectrometer as recited in claim 7,
wherein said plurality of samples are arranged concentrically around said opening and said extraction electrode and said drift tube are movable in a radial direction of said disk relative to said opening.

9. A mass spectrometer as recited in claim 1, further comprising a vacuum chamber,
wherein said ion detector, said extraction electrode and said drift tube are disposed inside said vacuum chamber.

10. A mass spectrometer as recited in claim 9,
wherein said sample holder is a continuous tape which is sealingly introduced into said vacuum chamber through an opening in a wall of said vacuum chamber.

11. A mass spectrometer as recited in claim 9,
wherein said sample holder is a continuous tape in a tape-cassette and said tape cassette is disposed in said vacuum chamber.

12. A mass spectrometer as recited in claim 1,
wherein said extraction electrode is a grid electrode.

13. A mass spectrometer as recited in claim 1, further comprising a sample holder voltage source,
wherein said sample holder is connected to said sample holder voltage source to establish a sample holder voltage potential relative to the ground potential.

14. A mass spectrometer as recited in claim 13,
wherein said sample holder voltage potential is pulsed.

15. A mass spectrometer as recited in claim 13, further comprising an extraction voltage source,
wherein said extraction electrode is connected to said extraction voltage source to establish an extraction voltage potential relative to the voltage potential of said sample holder.

16. A mass spectrometer as recited in claim 15,
wherein said extraction electrode voltage potential is pulsed.

17. A mass spectrometer as recited in claim 1, further comprising a drift tube voltage source,
wherein said drift tube is connected to said drift tube voltage source to establish a drift tube voltage potential.

18. A mass spectrometer as recited in claim 2, further comprising an acceleration electrode voltage source,
wherein said acceleration electrode is connected to said acceleration voltage source to establish a voltage potential substantially equal to a voltage potential of said drift tube.

19. A mass spectrometer as recited in claim 1,
wherein said ion detector comprises an electron multiplier.

20. A mass spectrometer as recited in claim 1,
wherein said ion detector comprises a channeltron.

21. A mass spectrometer as recited in claim 1,
wherein said ion detector comprises a micro-channel plate assembly.

22. A mass spectrometer as recited in claim 1,
wherein said ion detector is movable together with said extraction electrode and said drift tube relative to said sample holder.

23. A mass spectrometer as recited in claim 1,
wherein said ion detector is fixed in a substantially stationary position relative to said sample holder.

24. A mass spectrometer as recited in claim 23,
wherein said ion detector is a micro-channel plate assembly.

25. A mass spectrometer as recited in claim 24,
wherein said micro-channel plate assembly has a detection area substantially subtending an area of said sample holder.

26. A mass spectrometer as recited in claim 1,
wherein said ionizing source comprises a laser.

27. A mass spectrometer as recited in claim 26, further comprising a tracking assembly,
wherein said laser tracks a movement of said extraction electrode and said drift tube with said tracking assembly such that a laser beam emitted by the laser is directed upon the sample which is directly under said extraction electrode.

28. A mass spectrometer as recited in claim 26, further comprising an optical fiber,
wherein said laser tracks a movement of said extraction electrode and said drift tube by directing a laser beam emitted by the laser with said optical fiber upon the sample which is directly under said extraction electrode.

29. A mass spectrometer as recited in claim 1, further comprising a vacuum chamber,
wherein said vacuum chamber is pumped down to a pressure such that ions formed by ionization of said sample with said ionizing source move freely in said vacuum chamber toward said ion detector.

30. A method of analyzing a plurality of samples disposed on a sample holder by a mass spectrometer comprising an ionizing source, an ion detector, an extraction electrode arranged proximate to the sample holder, and a drift tube arranged between the extraction electrode and the ion detector, the method comprising:

positioning said extraction electrode and said drift tube above a first sample in said plurality of samples;

ionizing said first sample with said ionizing source to form a plurality of first ions;

detecting first ions from said plurality of first ions with said ion detector;

identifying at least a portion of said first ions detected;

moving at least said extraction electrode and said drift tube together relative to said sample holder to a second sample of said plurality of samples;

ionizing said second sample with said ionizing source to form a plurality of second ions;

detecting second ions from said plurality of second ions with said ion detector; and identifying at least a portion of said second ions detected.

* * * * *